Aug. 7, 1956
H. B. BERGESON
2,758,185
WELDING ROD HOLDER
Filed Aug. 25, 1954
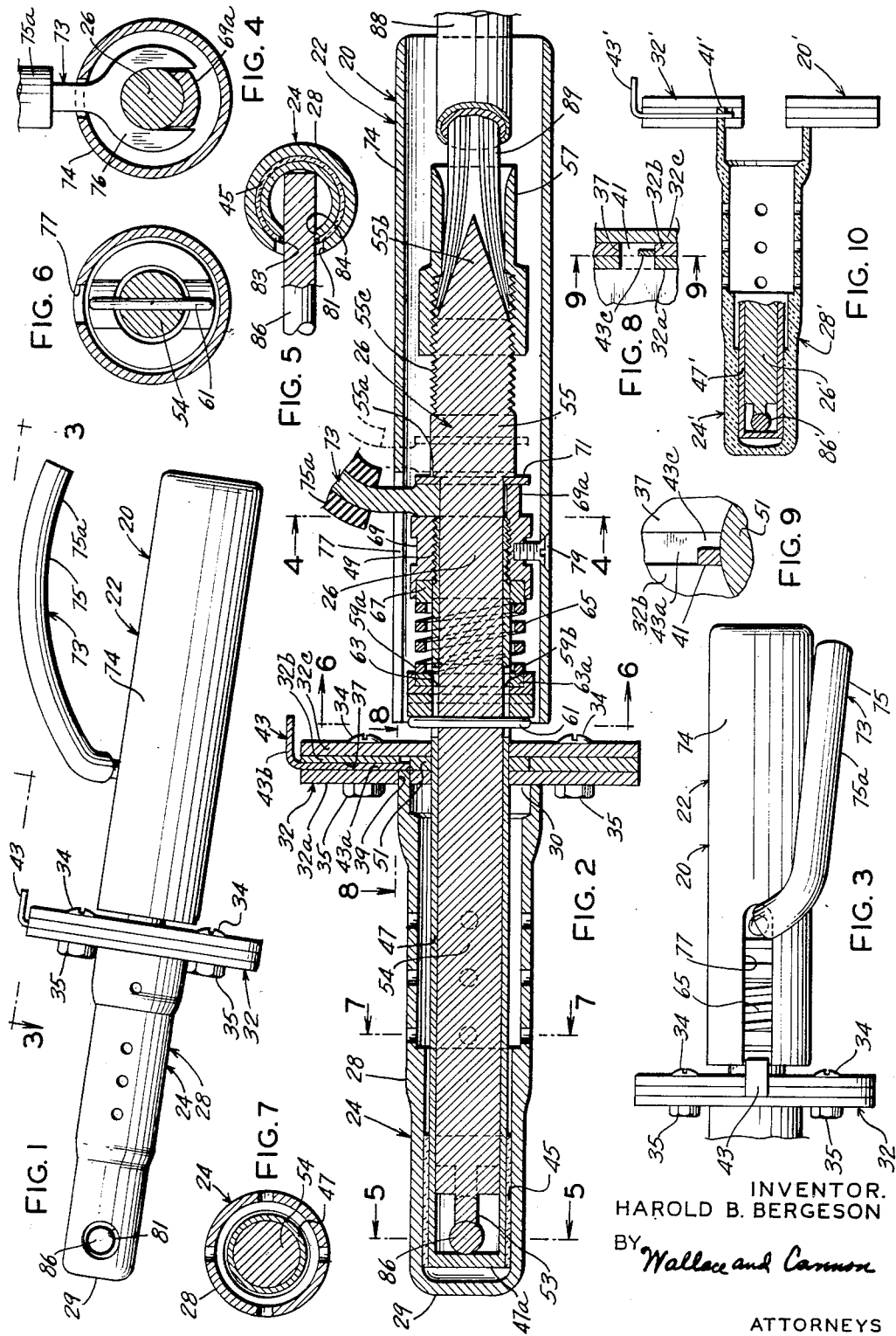
INVENTOR.
HAROLD B. BERGESON
BY Wallace and Cannon
ATTORNEYS United States Patent Office 2,758,185
Patented Aug. 7, 1956

2,758,185

WELDING ROD HOLDER

Harold B. Bergeson, Wilmington, Ill.

Application August 25, 1954, Serial No. 452,126

8 Claims. (Cl. 219—8)

This invention relates to electrode holders and more particularly to electrode holders of the type particularly well adapted for holding welding rod electrodes during electrical welding operations.

It is a primary object of my invention to afford a novel electrode holder of the type wherein electric current is passed therethrough to an electrode held thereby.

Another object of my invention is to provide a novel electrode holder of the aforementioned type wherein the parts thereof are constituted and arranged in a novel and expeditious manner so that the external parts thereof are electrically insulated from the electrode and the conductors feeding current to the electrode.

Another object is to afford a novel electrode holder of the aforementioned type which embodies clamping jaws for holding an electrode, and wherein the jaws may be opened and closed with a straight line, non-rotating reciprocatory movement in a novel and expeditious manner.

A further object is to afford a novel electrode holder of the aforementioned type wherein the clamping jaws may be quickly and easily opened and closed by either a simple twisting motion or a simple lever actuation.

Another object is to provide a novel electrode holder of the aforementioned type embodying rotatable actuating mechanism and lever actuating mechanism constituted and arranged in a maner to afford a novel, positive actuation of the clamping jaws of the device.

Yet another object of my invention is to provide an electrode holder of the aforementioned type which embodies a novel welding spatter shield member constructed in a novel manner and of a material which is particularly effective to afford efficient protection of the working parts of the holder against welding spatter.

A further object is to provide a novel welding rod holder of the aforementioned type which is practical and efficient in operation and may be readily and economically produced commercially.

Other and further objects of the present invention will be apparent from the following description and claims and are illustrated in the accompanying drawings which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a welding rod holder embodying the principles of my invention;

Fig. 2 is a longitudinal sectional view of the electrode holder shown in Fig. 1;

Fig. 3 is a detail top plan view looking in the direction of the arrows 3—3 in Fig. 1;

Fig. 4 is a sectional view taken substantially along the line 4—4 in Fig. 2;

Fig. 5 is a sectional view taken substantially along the line 5—5 in Fig. 2;

Fig. 6 is a sectional view taken substantially along the line 6—6 in Fig. 2;

Fig. 7 is a sectional view taken substantially along the line 7—7 in Fig. 2;

Fig. 8 is a detail sectional view taken substantially along the line 8—8 in Fig. 2;

Fig. 9 is a detail sectional view taken substantially along the line 9—9 in Fig. 8; and Fig. 10 is a longitudinal sectional view of a portion of a modified form of my novel electrode holder.

In Figs. 1 to 9, inclusive, of the drawings, an electrode holder 20, embodying the principles of my invention, is shown to illustrate the preferred embodiment of my invention. The holder 20 comprises, in general, a handle 22, a housing or insulator cap 24 and a plunger or conductor pin 26, Fig. 2, which are constituted and arranged in a manner wherein the handle 22 and the housing 24 are disposed substantially in alignment with each other, and the plunger 26 is disposed in the handle 22 and the housing 24 in a manner whereby the housing 24 and the plunger 26 afford novel clamping mechanism for holding a welding rod or electrode, and the handle 22 and the housing 24 are effective in a novel and expeditious manner to control the clamping relation of the plunger 26 and the housing 24 relative to such a welding electrode.

The insulator cap or housing 24 embodies a substantially tubular shaped shield 28 made of suitable material, such as aluminum, which will effectively repel welding spatter which may strike thereagainst and has a closed end 29 and an open end 30. The shield 28 is mounted on a substantially square shaped supporting plate 32 made of suitable material such as, for example, pressed paper fiber, or the like, with the open end 30 of the shield 28 disposed in abutting relation to the plate 32, and the closed end 29 projecting forwardly therefrom. The plate 32 is preferably laminated in construction embodying three sheets or laminae 32a, 32b and 32c clamped together by suitable means such as bolts 34 and nuts 35. The center sheet 32b embodies an elongated slot 37, Figs. 2, 8 and 9, extending downwardly from the upper edge thereof toward the center portion thereof. An opening 39 is formed in the front sheet 32a of the plate 32 and extends transversely therethrough in alignment with the lower portion of slot 37.

A hook 41, Figs. 2 and 8, is formed on and projects rearwardly from the open end 30 of the shield 28, and, when the shield 28 is disposed in operative position on the plate 32 with the open end disposed in abutting relation thereto, the hook 41 projects inwardly through the opening 39 in the front sheet 32a into the lower end portion of the recess 37 in the sheet 32b. A substantially L-shaped latching member 43 having a long leg 43a and a short leg 43b, Fig. 2, is slidably mounted in the recess 37 for movement upwardly and downwardly therein into and out of latching engagement with the hook 41. An ear 43c is formed on the lower end portion of the leg 43a of the latching member 43 and when the shield 28 is disposed in operative position on the plate 32 with the hook 41 disposed in the recess 37, the latch 43 may be slid downwardly through the recess 37 into position wherein the ear 43c is disposed in latching engagement with the hook 41, Figs. 8 and 9, to thereby releasably latch the shield 28 in such operative position on the plate 32.

A substantially tubular shaped insulator member 45, made of suitable material such as, for example, pressed paper fiber, or the like, is mounted in the shield 28 with the front end portion thereof disposed in abutting relation to the inner surface of the closed end 29 of the shield 28. As is best seen in Fig. 2, the inner surface of the closed end 29 of the shield 28 is substantially arcuate shaped so that the central portion thereof projects forwardly away from the sleeve 45.

A substantially tubular shaped sleeve 47, made of a suitable metal such as brass, is mounted in and projects through the plate 32. The front end portion of the sleeve 47 terminates in spaced relation to the end wall 29 of the shield 28, and is disposed in the insulating member 45 in position to be held thereby from contact with the shield 28. The rear end portion of the sleeve 47 projects rearwardly from the plate 32 and has external threads 49 formed on the rearward extremity thereof. The sleve 47 is held against longitudinal movement through the plate 32 by a ring 51 mounted thereon and secured thereto by suitable means such as, for example, brazing, the ring 51 fitting into a complementary shaped recess formed in the central sheet 32b and being clamped between the two sheets 32a and 32a of the plate 32.

The plunger 26 comprises a substantially straight elongated member made of suitable metallic, electrically conductive material, such as, for example, brass, and having a front end portion 53 connected by a central shank portion 54 to an enlarged head portion 55 in the rear end portion thereof. The head 55 has an outwardly projecting shoulder 55a formed at the front thereof and tapers to a rearwardly projecting point 55b at the rear end thereof. External threads 55c are formed on the head 55 between the shoulder 55a and the rear end portion 55b thereof, and a nut 57 is disposed on the head 55 in threaded engagement with the threads 55c.

Diametrically opposed elongated parallel slots 59a and 59b, Fig. 2, are formed in the sleeve 47 in parallel relation to the longitudinal axis thereof rearwardly of the plate 32. A pin 61 is mounted in the plunger 26 and projects outwardly through the slots 59a and 59b. A collar 63 is mounted on the sleeve 47 rearwardly of the pin 61 and is held in engagement with the pin 61 by a compression coil spring 65 mounted on the sleeve 47 and having its front end disposed in abutting relation to a washer 63a mounted in the rear face of the collar 63. The rear end portion of the spring 65 is disposed in abutting relation to a washer 67 mounted on the sleeve 47 in abutting relation to the front end of a nut 69 mounted on the sleeve 47 and threadedly engaged with the threads 49 formed on the rear end portion thereof. A washer 71 is mounted on the rear end portion of the central body portion 54 of the plunger 26 and is held in engagement with the shoulder 55a on the head 55 by a spacer or boss 69a formed on the nut 69 and projecting rearwardly along one side of the plunger 26, Figs. 2 and 4.

A lever 73 having an elongated arm 75 at one end thereof and a yoke 76 at the other end thereof, Figs. 1, 2 and 4, is mounted on the plunger 26 with the yoke 76 disposed in straddling relation to the rear end portion of the central body portion 54 of the plunger 26 between the nut 69 and the washer 71. The yoke 76 is preferably of such thickness that it fits snugly between the nut 69 of the washer 71, but may be manually pulled from such position when desired. As is best seen in Fig. 4, the yoke 76 of the lever 73 projects downwardly past the boss 69a on the nut 69 so that upon rotation of the nut 69 relative to the yoke 76 the lever 73 is rotated therewith.

An elongated substantially tubular shaped sleeve 74, Fig. 2, is mounted on the plunger 26 in enclosing relation thereto rearwardly of the plate 32 and, together with the lever 73, forms the handle 22. The sleeve 74 has an elongated slot 77 formed in the front end portion thereof therethrough, Figs. 2 and 3, in substantially parallel relation to the longitudinal axis of the sleeve 74. The slot 77 is slightly wider than the inner end portion of the arm 75 on the lever 73, so that the sleeve 74 may be mounted in operative position over the rear end portion of the plunger 26 by aligning the slot 77 with the inner end portion of the arm 75 of the lever 73 and moving the sleeve 74 forwardly on the plunger 26. The sleeve 74 is secured to the nut 69 by suitable means such as a screw 79 extending through the sleeve 74 into the nut 69. The screw 79 is counter-sunk in the sleeve 74 so as not to afford an exposed metallic surface on the exterior of the sleeve 74. The sleeve 74 may be formed of any suitable insulating material such as, for example, pressed paper fiber or the like, so that an operator holding the holder 20 by the sleve 74 is effectively insulated from electrical current passing through the plunger 26.

Likewise, a suitable electrical insulating sleeve 75a, made of suitable material such as rubber, is mounted on the arm 75 of the lever 73 to thereby afford effective insulation of the outwardly projecting portion of the lever 73.

From the foregoing it will be seen that upon rotation of the nut 69 in a direction effective to move the nut 69 rearwardly on the threads 49 on the rear end portion of the sleeve 47, the nut 69 presses the yoke 76 and the washer 71 rearwardly against the shoulder 55a on the head 55 of the plunger 26. This rearward pressure of the nut 69 is effective to move the plunger 26 rearwardly through the sleeve 47 against the urging of the compression coil spring 65, the pin 61 moving rearwardly through the slots 59a and 59b.

The rotation of the nut 69 in the other direction, so that the nut 69 is moved forwardly on the threads 49 on the sleeve 47, relieves the rearward pressure of the nut 69 on the plunger 26 and therefore permits the compression coil spring 65 pressing forwardly on the coil 53 and the pin 61 to move the plunger 26 forwardly through the sleeve 47.

A circular shaped opening 81, Figs. 1 and 5, is formed in one side of the front end portion of the shield 28, in rearwardly spaced relation to the front end 29 thereof. Similarly shaped openings 83 and 84 are formed in the insulating member 45 and the front end portion of the sleeve 47, respectively, in axial alignment with the opening 81. The openings 83 and 84 are preferably substantially of the same size and are considerably smaller in cross section than the opening 81 in the shield 28. The openings 83 and 84 are large enough to permit one end of a welding rod or electrode of the largest cross-sectional size which it is desired to hold in my novel electrode-holder 20, to be inserted therethrough and thus it will be seen that the one end of the electrode such as the electrode 86, Figs. 2 and 5, may be inserted through the openings 83 and 84 into abutting relation to the inner face of the sleeve 47 opposite the opening 69, when the plunger 26 is retracted from alignment with the openings 83 and 84. The openings 83 and 84 are preferably so disposed in the insulating member 45 and the sleeve 47 that the front end wall 47a of the sleeve 47 forms a tangent to the opening 84. Hence, it will be seen that any electrode such as the electrode 86 disposed in the opening 84 may be held forwardly against the end wall 47a of the sleeve 47 but is held in spaced relation to the shield 28. Thus, by moving the plunger 26 forwardly and rearwardly in the sleeve 47, the front end portion 53 of the plunger 26 may be moved into and out of position wherein it is effective to clamp an electrode such as the electrode 86 against the end wall 47a of the sleeve 47.

Movement of the plunger 26 through a full opening and closing reciprocation in the sleeve 47 may be effected by rotation of the nut 69 on the sleeve 47 as previously discussed, the slots 59a and 59b being of such length and so disposed on the sleeve 47 that the pin 61 may move forwardly and rearwardly therein through a path of travel of sufficient length to permit the plunger 26 to move to a fully open and fully closed position.

Such rotation of the nut 69 may be effected by rotating the sleeve 74 of the handle 22 relative to the housing 24 and the plunger 26. It will be remembered that such rotation of the sleeve 74 is effective to similarly rotate the lever 73 around the plunger 26.

In addition to reciprocation of the plunger 26 in the sleeve 47 by rotation of the handle 22, the plunger 26 may be reciprocated in the sleeve 47 by oscillation of the lever 73 around the yoke 76 toward and away from the sleeve 74. Thus it will be seen that when the lever 73 is pivoted around the yoke 76 from its normal position shown in said lines in Fig. 2 to the position shown in the broken lines in Fig. 2, the pivoting movement of the yoke 76 between the nut 69 and the washer 71 is effective to press the plunger 26 rearwardly relative to the nut 69 and the sleeve 47. With this construction, an operator may move the plunger 26 into effective clamping engagement with an electrode mounted in position in the openings 81, 83 and 89 and, thereafter, if it is desired to remove and reinsert the electrode, or remove it and replace it with another electrode of the same size, or the like, the operator may quickly and easily actuate my novel holder 20 for this purpose by pressing the arm 75 of the lever 73 inwardly toward the sleeve 74 to retract the plunger 26, and release the lever 73 so that the plunger 26 is movable by the spring 65 to return the plunger 26 to clamping position.

Hence, in the operation of my novel device, the sleeve 78 may be removed from the nut 69 and slid on to the front end of a suitable conductor such as a cable 88. The nut 57 may then be removed from the plunger 26 and slid rearwardly onto the wires 89 of the cable 88. The wires 89 of the cable 88 may then be engaged with the tapered rear portion 55b of the plunger 26 and the nut 57 may be screwed on to the threads 55c to clamp the wires 89 into good electrical contact with the point 55b on the plunger 26. The sleeve 78 may then be moved forwardly into operative position on the plunger 26 and secured to the nut 69 by the screw 79. The sleeve 78 may then be moved forwardly into operative position on the plunger 26 and secured to the nut 69 by the screw 79. The sleeve 78 may then be rotated in the proper direction to move the plunger 26 rearwardly in the sleeve 47 to a position wherein an electrode such as the electrode 86 may be inserted through the openings 81, 83 and 84. The sleeve 78 may then be rotated in the other direction to thereby permit the spring 65 to move the plunger 26 forwardly through the sleeve 47 into clamping position with the electrode 86. In this manner, the forward position of the plunger 26 may be so adjusted that the front end portion 53 thereof is permitted to be moved forwardly by the spring 65 into firm clamping engagement with the electrode 86.

Thereafter, if it is desired to remove the electrode 86 from the holder 20 and replace it with an electrode of the same cross-sectional size, or of another size within the limits of movement of the lever 73, the plunger 26 may be readily retracted from clamping position by gripping the handle 22 in such a manner as to move the arm 75 of the lever 73 inwardly toward the sleeve 74 and then, after the electrode has been removed and replaced, releasing the handle 22 to thereby free the plunger 26 to the forward urging of the spring 65. If it is desired to change the electrode 86 for an electrode of a different size, which is outside the range of movement of the plunger 26 by the lever 73, the nut 69 may again be adjusted on the sleeve 47 by rotation of the sleeve 74 to thereby again position the front end portion 53 of the plunger 26 within the limits of movement by the lever 73.

In Fig. 10, a modified form of my invention is shown wherein parts similar to the parts shown in Figs. 1 to 9, inclusive, are indicated by the same reference numerals with a prime mark added thereto.

In the modified form of my invention, the shield 28' of the housing 24' is formed of a suitable material which affords an effective electrical insulation member which may be directly engaged with the sleeve 47. For this purpose I have found that by constructing the shield 28' of a heat-resistant synthetic resin, which will withstand temperatures up to 500° F. without undesirable softening, such as polytetrafluorethylene resin, a novel electrode holder is afforded which may be mounted in direct contact with the sleeve 47'.

The maximum temperature to which such a shield 28' is normally subjected during a welding operation is approximately 400° F. Hence, with the shield 28' constructed of polytetrafluorethylene resin a practical shield is afforded for such a purpose which has good electrical insulation characteristics and which will effectively repel welding spatter which may strike against it.

From the foregoing, it will be seen that I have afforded a novel electrode holder wherein the clamping members are moved in a novel and expeditious manner in straight line relation to each other without twisting and sliding motion. Also it will be seen that I have afforded a novel electrode holder wherein the holder may be readily adjusted to clampingly hold electrodes of various predetermined sizes and, thereafter, while using electrodes of the same size or a size which does not vary greatly from the original size, the holder may be readily manipulated by a simple lever movement of a portion of the handle.

In addition, it will be seen that I have afforded a novel holder of the aforementioned type wherein the plunger is, at all times, yieldingly urged forwardly by a compression spring, and the compression spring, also, at all times presses against the adjusting nut so that it tends to hold the nut in adjusted position.

Also, it will be seen that I have afforded a novel electrode holder which is sturdy, practical in construction, effective in operation, and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of following claims.

I claim:

1. A welding electrode holder comprising elongated sleeve means having an opening in one side thereof for the insertion of such an electrode in operative position therein, an elongated plunger slidably mounted in said sleeve means for longitudinal reciprocation longitudinally of said sleeve means into and out of clamping engagement with such an electrode disposed in said position, and means for reciprocating said plunger in said sleeve means, said means for reciprocating said plunger comprising a nut threaded onto said sleeve means, abutment means on said plunger, a lever mounted on said plunger between said nut and said abutment means, said lever being movable on said plunger to move said nut and said abutment means away from each other, and means for urging said nut toward said abutment means, said urging means comprising a spring connected to said nut and said plunger in position to urge said plunger to slide forwardly through said sleeve means toward said electrode.

2. A welding electrode holder comprising a housing including an elongated sleeve, said housing having an opening formed in one side thereof for the insertion of such an electrode in operative position therein, a plunger slidably mounted in said sleeve for reciprocation therein longitudinally of said sleeve into and out of clamping relation to such an electrode disposed in said position, and means for reciprocating said plunger in said sleeve, said means comprising abutment means on said plunger, a nut threaded onto said sleeve and engaged with said abutment means, and spring means mounted on said plunger in position to urge said nut and said abutment means towards each other, said abutment means comprising a lever mounted on said plunger in engagement with said nut, said lever being pivotally mounted on said plunger and pivotable toward and away from said nut.

3. A welding electrode holder comprising a housing including an elongated sleeve, said housing having an opening formed in one side thereof for the insertion of such an electrode in operative position therein, a plunger slidably mounted in said sleeve for reciprocation therein longitudinally of said sleeve into and out of clamping relation to such an electrode disposed in said position, and means for reciprocating said plunger in said sleeve, said means comprising a lever rotatably mounted on said plunger for rotation therearound and being operable upon rotation of said lever around said plunger to move said plunger longitudinally of said lever, said lever having a normal position and an actuated position and being operable upon movement from said normal position to said actuated position to move said plunger longitudinally in said sleeve away from said electrode, and spring means connected to said lever in position to urge said lever toward said normal position.

4. A welding electrode holder comprising a housing including an elongated sleeve, said housing having an opening formed in one side thereof for the insertion of such an electrode in operative position therein, a plunger slidably mounted in said sleeve for reciprocation therein longitudinally of said sleeve into and out of clamping relation to such an electrode disposed in said position, and means for reciprocating said plunger in said sleeve, said means comprising a nut threadedly engaged with said sleeve, an abutment on said plunger on the opposite side of said nut from said electrode, a lever having one end portion mounted between said abutment and said nut in engagement therewith, said lever being pivotally mounted for oscillation longitudinally of said plunger, and spring means connected between said plunger and said nut in position to urge said plunger toward said electrode and to urge said abutment and said nut toward each other.

5. A welding electrode holder comprising a substantially tubular shaped shield, an elongated sleeve mounted in said shield and electrically insulated therefrom, said shield and said sleeve having aligned openings therein for the reception of such an electrode in operative position therein, an elongated plunger mounted in said sleeve in longitudinal alignment therewith, said plunger being slidably mounted in said sleeve for reciprocation therein longitudinally of said sleeve into and out of clamping engagement with such an electrode disposed in said position, and means for reciprocating said plunger in said sleeve, said means comprising a nut threaded on one end portion of said sleeve, a shoulder on said plunger in spaced relation to said sleeve, a lever pivotally mounted between said nut and said shoulder in engagement therewith and pivotable therebetween in a direction to move said nut and said shoulder away from each other, and a spring mounted on said sleeve between said nut and said electrode, said spring being connected to said nut and said plunger in position to urge said plunger toward said electrode and to urge said shoulder toward said nut.

6. A welding electrode holder comprising a substantially tubular shaped shield, an elongated sleeve mounted in said shield and electrically insulated therefrom, said shield and said sleeve having aligned openings therein for the reception of such an electrode in operative position therein, an elongated plunger mounted in said sleeve in longitudinal alignment therewith, said plunger being slidably mounted in said sleeve for reciprocation therein longitudinally of said sleeve into and out of clamping engagement with such an electrode disposed in said position, and means for reciprocating said plunger in said sleeve, said means comprising an elongated substantially tubular-shaped handle member disposed around said plunger, means threadedly connecting said handle to said sleeve, said last named means being rotatable on said plunger and said handle being rotatable with said last named means, an abutment on said plunger, said handle member having an elongated slot therein, an elongated lever having one end portion mounted between said last named means and said abutment member, said lever projecting outwardly through said slot and being pivotable longitudinally thereof for moving said abutment and said last named means away from each other, a compression coil spring mounted on said sleeve within said handle, said spring being connected between said last named means and said plunger in position to urge said plunger toward said electrode and to urge said abutment and said last named means toward each other.

7. A welding electrode holder comprising an elongated shield member having an opening in one end thereof for the insertion of such an electrode in operative position therein, an elongated metal sleeve having one end portion mounted in said shield, an electrical insulating member mounted on said one end portion of said sleeve in position to space said shield from said sleeve, said sleeve and said insulation member each having an opening therethrough in axial alignment with said opening in said shield, said openings in said sleeve and said insulation member being smaller in cross-section than said opening in said shield, a plate of electrical insulating material, said sleeve being mounted in and extending through said plate with said one end portion thereof projecting from said plate on one side thereof, said sleeve having another end portion projecting from the opposite side of said plate from said one end portion thereof, said shield being mounted on said plate in abutting relation thereto, means on said plate for supporting said shield thereon, an elongated metal plunger having one end portion slidably mounted in said sleeve for longitudinal reciprocation therein toward and away from clamping engagement with such an electrode disposed in said position, an abutment on the other end portion of said plunger, a nut threaded on said other end portion of said sleeve, a second sleeve mounted around said other end of said plunger and secured to said nut for rotation with the latter, an elongated lever pivotally mounted on said plunger between said nut and said abutment in engagement therewith, said lever projecting outwardly through said second sleeve and being rotatable with said second sleeve and pivotable relative thereto for moving said abutment away from said nut, and a compression coil spring mounted on said metal sleeve and connected to said metal sleeve and said plunger in position to urge said plunger toward said electrode and said abutment toward said nut.

8. A welding electrode holder comprising a housing including an elongated sleeve, said housing having an opening in one side thereof for the insertion of such an electrode in operative position therein, a plunger slidably mounted in said sleeve for reciprocation therein longitudinally of said sleeve into and out of clamping relation to such an electrode disposed in said position, an abutment on said plunger, a nut threadedly mounted on said sleeve, a second sleeve mounted around said plunger and secured to said nut for rotation with the latter, an elongated lever extending through said second sleeve and pivotably mounted on said plunger between said nut and said abutment, said plunger being rotatable with said sleeve and pivotable relative thereto for moving said abutment away from said nut, and spring means connected to said first mentioned sleeve and said plunger in position to urge said abutment toward said nut.

UNITED STATES PATENTS

References Cited in the file of this patent

| | | |
|---|---|---|
| 2,060,606 | Bowlus | Nov. 10, 1936 |
| 2,430,536 | Smith | Nov. 11, 1947 |
| 2,609,471 | Bergeson | Sept. 2, 1952 |

OTHER REFERENCES

Industrial and Engineering Chemistry, vol. 38, No. 9, September 1946, pp. 871–877.